US009475234B2

(12) United States Patent
Morikawa

(10) Patent No.: US 9,475,234 B2
(45) Date of Patent: Oct. 25, 2016

(54) POWDER REMOVING APPARATUS, MOLDING SYSTEM, AND METHOD OF MANUFACTURING MOLDED OBJECT

(75) Inventor: Hiroaki Morikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 885 days.

(21) Appl. No.: 13/590,689

(22) Filed: Aug. 21, 2012

(65) Prior Publication Data

US 2013/0052291 A1    Feb. 28, 2013

(30) Foreign Application Priority Data

Aug. 30, 2011   (JP) ................. 2011-186676

(51) Int. Cl.
*B29C 67/00*    (2006.01)

(52) U.S. Cl.
CPC ....... *B29C 67/0077* (2013.01); *B29C 67/0096* (2013.01)

(58) Field of Classification Search
None
See application file for complete search history.

(56) References Cited

U.S. PATENT DOCUMENTS

| 5,817,206 A * | 10/1998 | McAlea et al. ............ 156/272.8 |
| 2002/0090410 A1 * | 7/2002 | Tochimoto .......... B29C 67/0081 425/215 |
| 2004/0012112 A1 * | 1/2004 | Davidson et al. ............ 264/109 |
| 2006/0157892 A1 * | 7/2006 | Larsson ....................... 264/308 |
| 2007/0026145 A1 * | 2/2007 | Lindemann ......... B29C 67/0077 427/248.1 |
| 2011/0049739 A1 * | 3/2011 | Uckelmann ........ A61C 13/0013 264/16 |

FOREIGN PATENT DOCUMENTS

JP    2002-248691    9/2002

* cited by examiner

*Primary Examiner* — Ryan Ochylski
(74) *Attorney, Agent, or Firm* — Chip Law Group

(57) ABSTRACT

A powder removing apparatus includes a box, a stage moving mechanism, and a powder removing processing mechanism. The box has a main body with an opening and a stage movably provided in the main body. The box is capable of accommodating a molded object and non-bonding powder so as to arrange the molded object, which is formed using powder according to a rapid prototyping technique, on the stage together with the non-bonding powder. The stage moving mechanism is capable of moving the stage upward relative to the main body inside the main body. The powder removing processing mechanism is configured to remove the non-bonding powder existing around the molded object extruded by a driving operation of the stage moving mechanism via the opening.

12 Claims, 13 Drawing Sheets

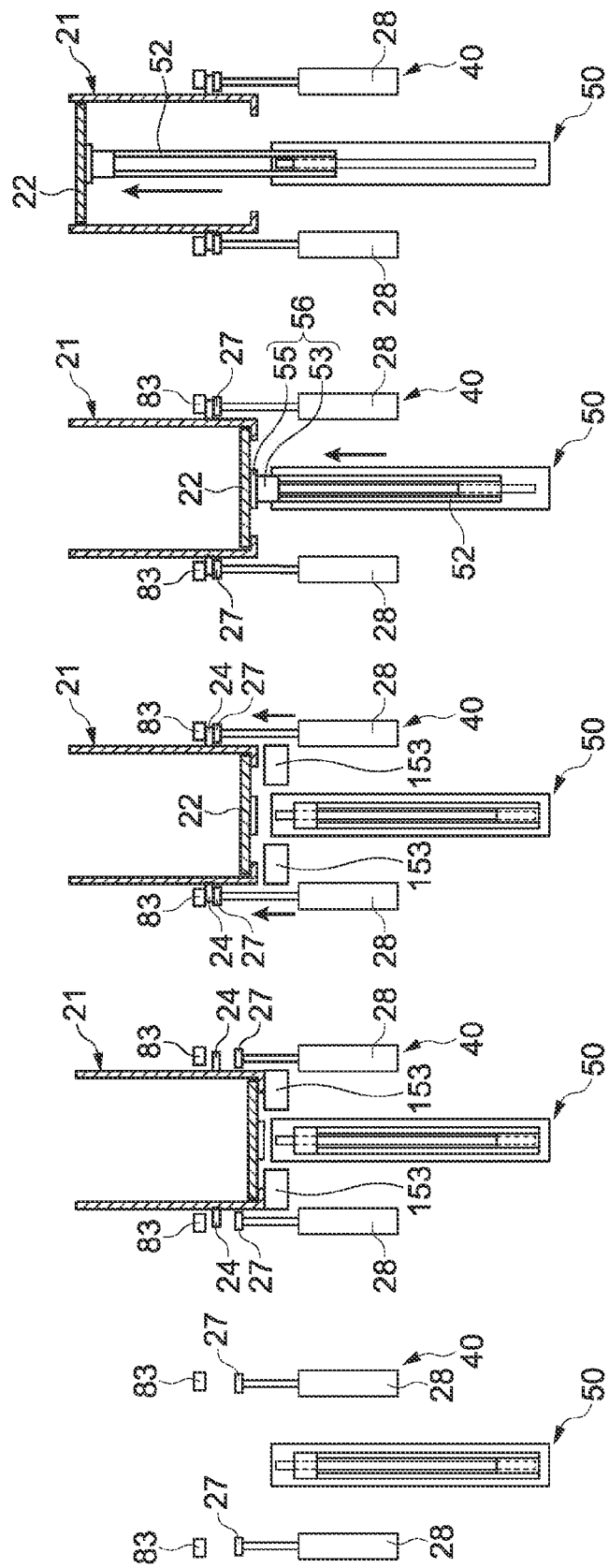

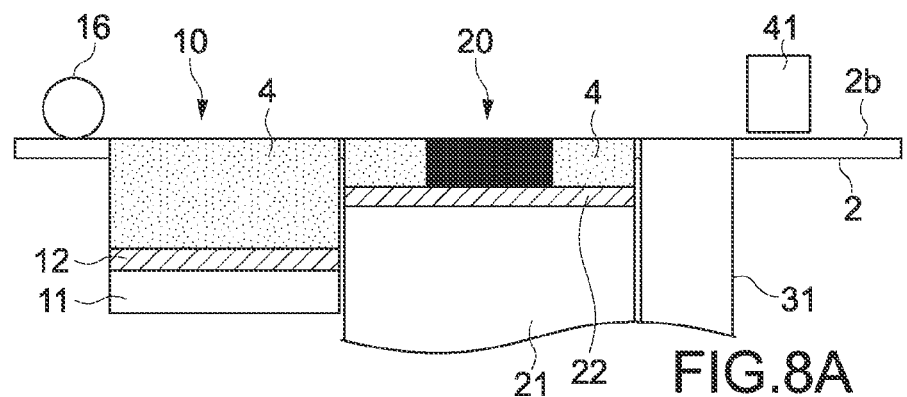
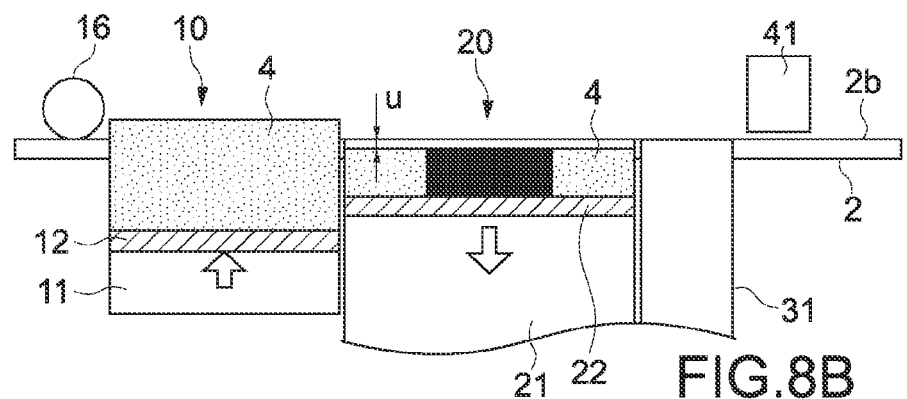
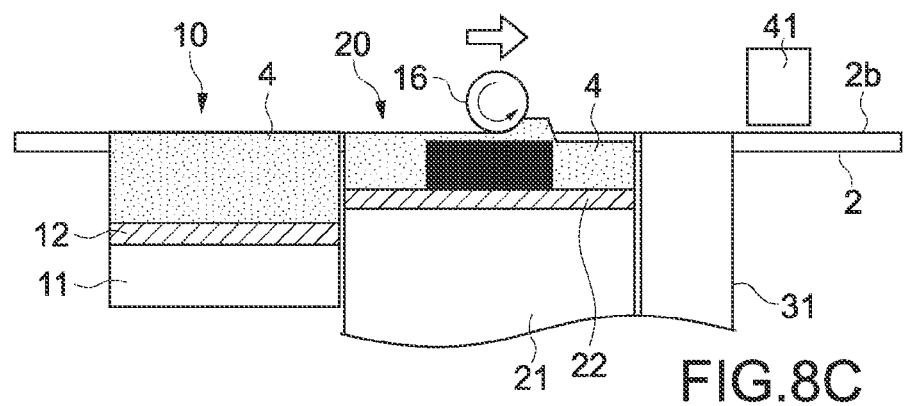
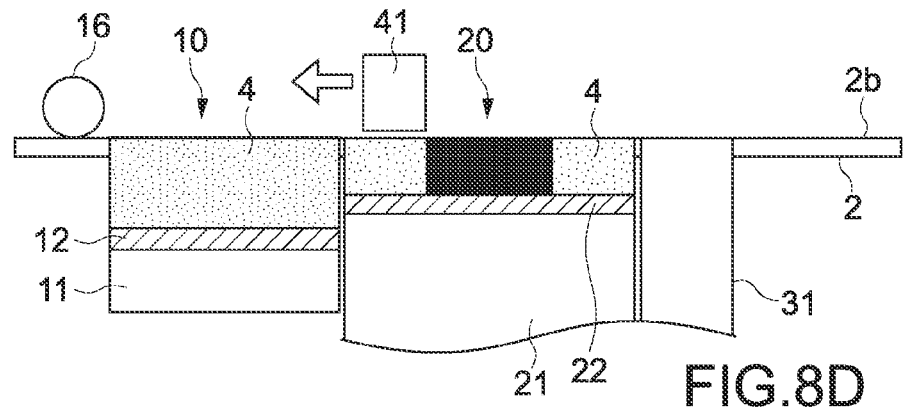

POWDER REMOVING APPARATUS, MOLDING SYSTEM, AND METHOD OF MANUFACTURING MOLDED OBJECT

BACKGROUND

The present disclosure relates to a molding apparatus that forms a molded object using a powder material according to a rapid prototyping technique, a powder removing apparatus for use in the molding apparatus, and a method of manufacturing a molded object.

A molding apparatus described in Japanese Patent Application Laid-open No. 2002-248691 has a lamination molding unit 20, a powder removing unit 30, and the like. In the lamination molding unit 20, a lamination molding operation is performed to form a molded object 91 on a tray 9. The tray 9 is moved downward by a tray conveying part 50. After the molded object 91 is formed in the lamination molding unit 20, the tray 9 is moved downward. Then, the molded object 91 is subjected to powder removing processing in the powder removing unit 30 (see, for example, paragraphs [0060] and [0070] and FIGS. 1, 4, and 7A and 7B of Japanese Patent Application Laid-open No. 2002-248691).

SUMMARY

As described above, it may be desired that a molding apparatus has increased efficiency of producing a product (molded object), and in particular, there may be a need for a new type of mechanism that removes a powder material.

The present disclosure has been made in view of the above circumstances, and it is therefore desirable to provide a new powder removing apparatus capable of removing powder, a molding system having the powder removing apparatus, and a method of manufacturing a molded object.

To this end, a powder removing apparatus according to an embodiment of the present disclosure includes a box, a stage moving mechanism, and a powder removing processing mechanism.

The box has a main body with an opening and a stage movably provided in the main body. The box is capable of accommodating a molded object and non-bonding powder so as to arrange the molded object, which is formed using powder according to a rapid prototyping technique, on the stage together with the non-bonding powder.

The stage moving mechanism is capable of moving the stage upward relative to the main body inside the main body.

The powder removing processing mechanism is configured to remove the non-bonding powder existing around the molded object extruded by a driving operation of the stage moving mechanism via the opening.

When the stage moving mechanism moves upward the stage provided in the box, at least part of the molded object is extruded from the opening of the main body. Thus, the new powder removing apparatus capable of removing the non-bonding powder from the upper part of the box can be provided.

The box may be capable of vertically accommodating a plurality of molded objects on a plurality of shelves. In this case, the powder removing apparatus may further include a controlling part configured to operate the stage moving mechanism such that corresponding one of the plurality of molded objects accommodated on the plurality of shelves is extruded from the main body for each of the plurality of shelves, and configured to operate the powder removing processing mechanism for each of the plurality of shelves.

According to the embodiment of the present disclosure, powder removing processing is performed for each of the plurality of shelves, and the non-bonding powder is removed from the powder removing apparatus for each of the plurality of shelves. Therefore, compared with a case, for example, where powder inside the box is discharged at one time, the random order and the random arrangement of the plurality of molded objects can be prevented. Thus, productivity for the molded objects can be increased.

The powder removing apparatus may further include an acquiring part configured to acquire related information related to the molded object inside the main body of the box and a controlling part configured to operate the powder removing processing mechanism based on the acquired related information.

The acquiring part may be configured to acquire at least three-dimensional data on the object to be molded for use in the rapid prototyping technique as the related information. For example, with the use of the three-dimensional data for forming the molded object, it is not necessary for the controlling part to generate separate information.

The powder removing processing mechanism may include a nozzle configured to eject gas onto the molded object and a nozzle driving mechanism configured to variably drive at least one of a position and a posture of the nozzle according to control of the controlling part based on the three-dimensional data. Thus, powder removing precision is increased.

The powder removing processing mechanism may include a powder removing operating region, a nozzle configured to eject gas onto the molded object, and an attracting mechanism configured to attract the non-bonding powder existing in the powder removing operating region. With the use of the nozzle that ejects the gas, the powder removing precision is increased.

The powder removing apparatus may further include a determining part configured to determine progress on powder removing processing of the powder removing processing mechanism.

The determining part may include a sensor configured to detect an amount of the non-bonding powder collected from the powder removing processing mechanism. Thus, the controlling part of the powder removing apparatus can recognize the progress on the powder removing processing based on the detected amount of the non-bonding powder.

The determining part may include a sensor configured to detect a degree of clearness of air inside a powder removing operating region of the powder removing processing mechanism. Thus, the controlling part of the powder removing apparatus can recognize the progress on the powder removing processing based on whether the air inside the powder removing operating region has a predetermined degree of clearness.

The powder removing apparatus may further include a sieving mechanism configured to remove a foreign substance from the non-bonding powder collected from the powder removing processing mechanism. Thus, the non-bonding powder from which the foreign substance is removed can be collected and recycled.

The powder removing apparatus may further include a supporting mechanism configured to detachably support the box. Thus a molding apparatus can, for example, use the box for molding processing. For example, with the preparation of a plurality of boxes, it is possible to perform the molding processing with the molding apparatus while performing the powder removing processing with the powder removing apparatus. Therefore, productivity for the molded object can be increased.

A molding system according to another embodiment of the present disclosure includes a molding apparatus that forms a molded object using powder according to a rapid prototyping technique and the powder removing apparatus described above. When the stage moving mechanism moves upward the stage provided in the box, at least part of the molded object is extruded from the opening of the main body. Thus, the molding system including the new powder removing apparatus capable of removing the non-bonding powder from the upper part of the box can be provided.

A method of manufacturing a molded object according to still another embodiment of the present disclosure includes forming the molded object using powder according to a rapid prototyping technique.

A stage is moved upward relative to a box inside a main body of the box. The box has the main body with an opening and the stage movably provided in the main body. Further, the box is capable of accommodating the molded object and non-bonding powder so as to arrange the molded object on the stage together with the non-bonding powder.

The non-bonding powder existing around the molded object, which is extruded by the upward movement of the stage via the opening of the box, is removed.

As described above, according to the embodiments of the present disclosure, it is possible to provide a new powder removing apparatus capable of removing powder.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 7A to 7E are views successively showing operations where the box is loaded into a box holding mechanism;

FIGS. 8A to 8D are views successively showing mainly the molding operation of the molding apparatus and are schematic views as seen from the lateral surface of the molding apparatus;

DETAILED DESCRIPTION OF EMBODIMENTS

Hereinafter, embodiments of the present disclosure will be described with reference to the drawings.

(Molding Apparatus)

(Configuration of Molding Apparatus)

Figure 1:
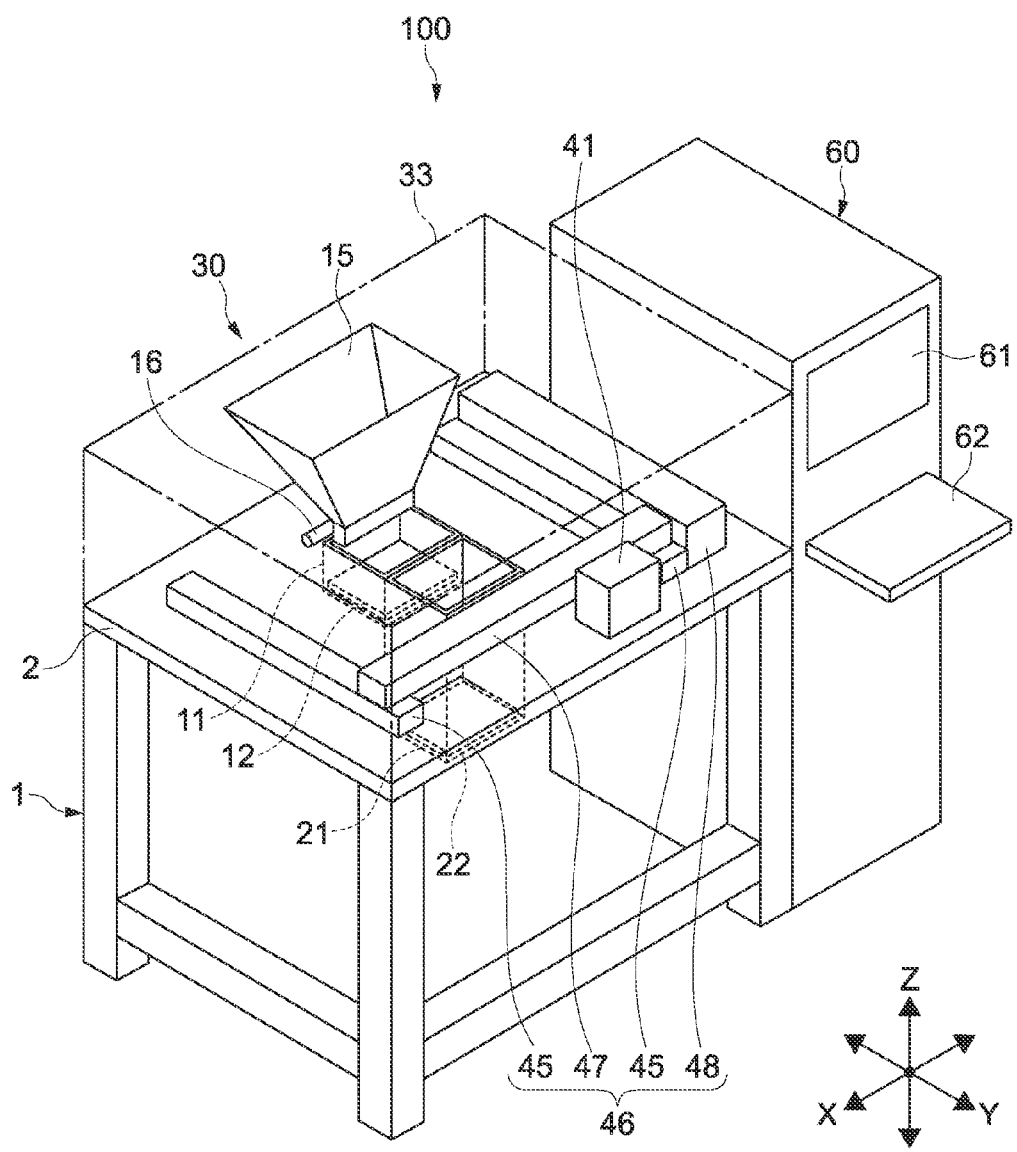
FIG. 1 is a view showing a molding apparatus according to an embodiment of the present disclosure.
Figure 2:
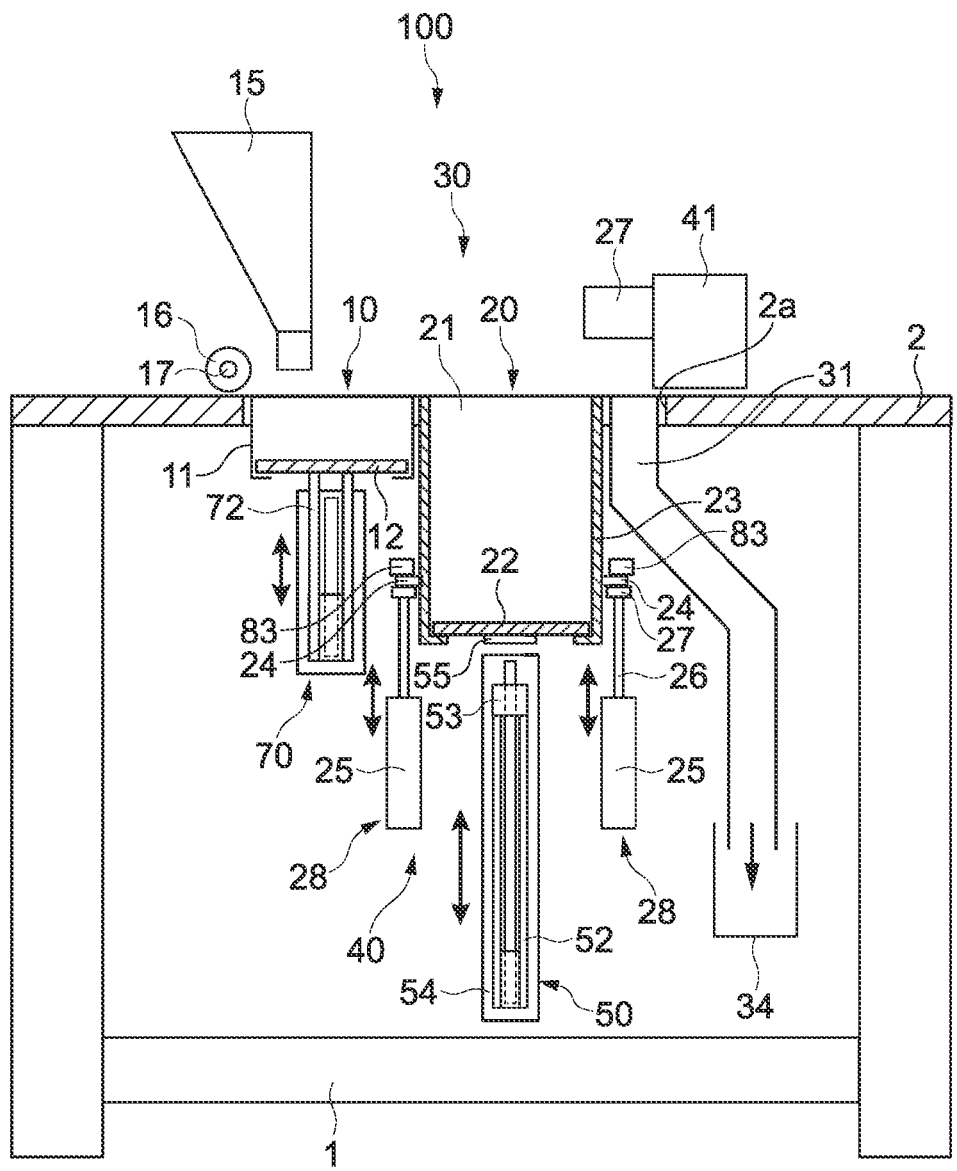
FIG. 2 is a side view of the molding apparatus shown in FIG. 1.
Figure 3:
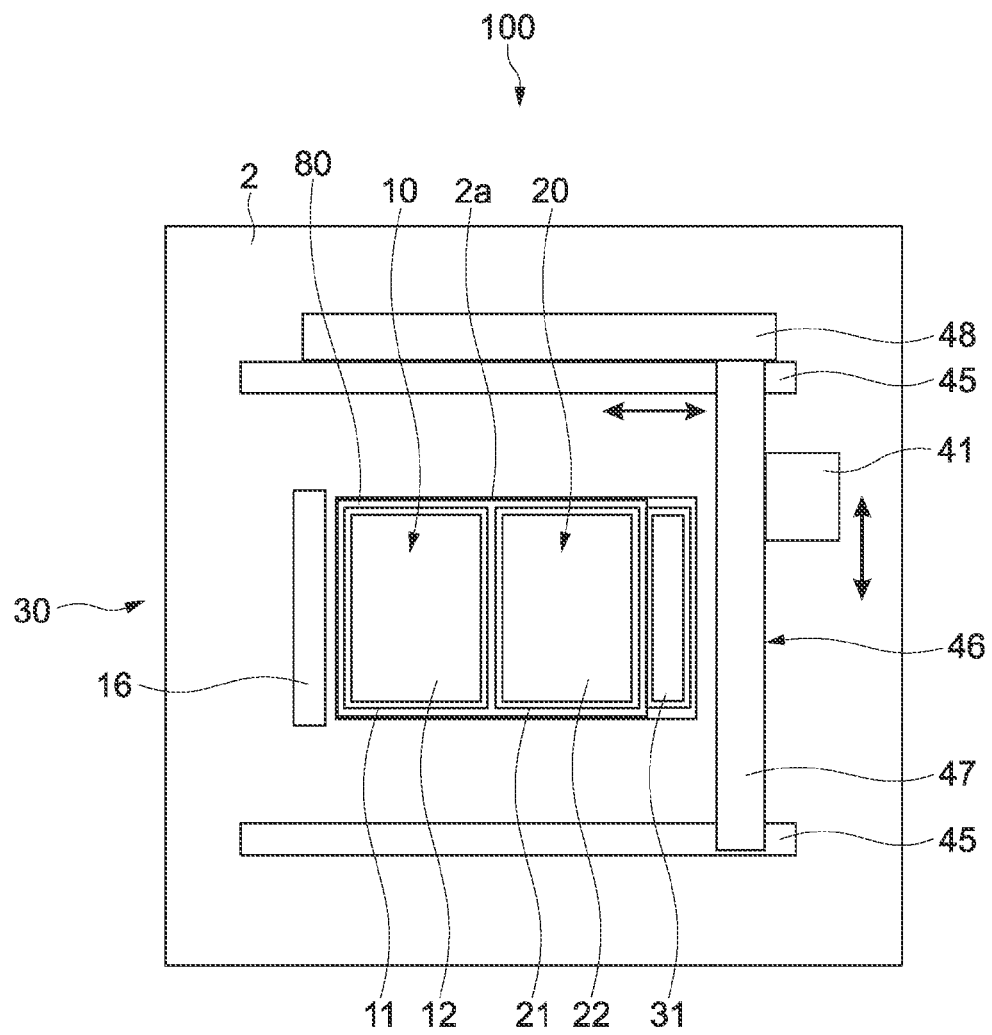
FIG. 3 is a plan view of the molding apparatus shown in FIG. 1.

FIG. 1 is a view showing a molding apparatus according to an embodiment of the present disclosure. FIG. 2 is a side view of the molding apparatus shown in FIG. 1, and FIG. 3 is a plan view of the molding apparatus shown in FIG. 1.

The molding apparatus 100 forms a molded object using powder as a material according to a rapid prototyping technique.

The molding apparatus 100 has a molding unit 30 and a controlling unit 60 arranged next to the molding unit 30. The molding unit 30 has a frame 1 and a plate 2 fixed onto the frame 1. At about a central area of the plate 2, an opening 2a for use in a molding operation is provided along a Y direction, i.e., the longitudinal direction of the plate 2. Under the opening 2a, a supplying part 10 that supplies powder, a molding part 20 that forms a molded object using the powder, and a discharging path member 31 (omitted in FIG. 1) that discharges the powder are arranged. As shown in FIGS. 2 and 3, the supplying part 10, the molding part 20, and the discharging path member 31 are arranged so as to be successively side by side along the Y direction from the left side of the figures.

Note that a frame (not shown) is also provided on the plate 2, and a cover 33 is attached to the frame as shown in FIG. 1. The cover 33 is made of an acrylic resin or the like, and a user can thus externally see the inside of the molding unit 30. Further, the cover 33 is subjected to anti-static processing to prevent its visibility from being degraded due to the attachment of static-charged powder.

The supplying part 10 has a supplying box 11 that is capable of storing the powder 4 (see FIGS. 8A to 8D) and includes a supplying stage 12, and has an elevating mechanism 70 that elevates the supplying stage 12 inside the supplying box 11. When the elevating mechanism 70 is driven, the supplying stage 12 pushes upward the powder 4 stored in the supplying box 11 from below inside the supplying box 11 to supply the powder 4 onto the plate 2 via the opening 2a. As the elevating mechanism 70, a ball screw mechanism, a rack-and-pinion mechanism, or the like is used.

As shown in FIGS. 1 and 2, over the supplying part 10, a tank shooter 15 that temporarily stores the powder supplied by an operator or a robot is provided. At the bottom of the tank shooter 15, a cover (not shown) that opens and closes with, for example, electrical control is provided. When the cover opens, the stored powder falls due to its own weight and is supplied to the supplying part 10.

As the powder 4, an aqueous material is used. For example, an inorganic substance such as salt, magnesium sulfate, magnesium chloride, potassium chloride, and sodium chloride is used. A mixture of sodium chloride and a bittern component (such as magnesium sulfate, magnesium chloride, and potassium chloride) may be used. That is, the mixture includes sodium chloride as its main component. Alternatively, an organic substance such as polyvinyl pyrrolidone, polyvinyl alcohol, carboxymethyl cellulose, ammonium polyacrylate, sodium polyacrylate, ammonium methacrylate, sodium methacrylate, and a copolymer thereof can be used.

The powder 4 typically has an average particle diameter of 10 μm or more and 100 μm or less. Using salt as the powder 4 is environmentally friendly because energy for extraction, processing, or the like of the powder material is saved compared with a case where the powder material of metal, plastic, or the like is, for example, used.

The molding part 20 arranged next to the supplying part 10 has a box 21 capable of accommodating the powder 4 and an elevating mechanism 50 that elevates a stage 22 provided inside the box 21. The box 21 is detachably provided in a box holding mechanism 40. The box holding mechanism 40 and the elevating mechanism 50 will be described later.

When seen in FIG. 3, the box 21 is set to have a length of 20 cm to 50 cm in the X direction and a length of 10 cm to 30 cm in the Y direction. However, the lengths of the box 21 are not limited within these ranges. The region where the powder accommodated in (a main body 23 of) the box 21 is arranged is used as a molding enabling region.

The supplying box 11, the box 21, and the discharging path member 31 have respective openings at their upper parts, and each of the opening surfaces of the openings is arranged so as to face the opening 2a (see FIG. 3) of the plate 2.

Near the end of the opening 2a of the plate 2 on the side of the supplying part 10, a roller 16 that conveys the powder 4 supplied from the supplying part 10 to the molding part 20 is arranged. The roller 16 has a rotary shaft 17 (see FIG. 2) along a direction orthogonal to the direction in which the supplying box 11, the box 21, and the discharging path member 31 are aligned in a horizontal plane, i.e., the X direction. A motor (not shown) that rotates the rotary shaft 17 is also provided. On the plate 2, a mechanism (not shown) that moves the roller 16 in the Y direction is provided.

As shown in FIG. 2, the discharging path member 31 is provided in a folded state so as not to interfere with the box holding mechanism 40. Under the discharging path member 31, a collecting box 34 is arranged. The excessive powder falling via the discharging path member 31 due to its own weight is collected into the collecting box 34.

Over the plate 2, a print head 41 and a print head moving mechanism 46 that moves the print head 41 in the X and Y directions are provided. The print head 41 is capable of ejecting ink onto the powder 4 stuck on the stage 22 in the molding part 20. The print head 41 and the print head moving mechanism 46 serve as a supplying mechanism that supplies a liquid.

The print head moving mechanism 46 has guide rails 45 extending along the Y direction on both sides in the X direction of the opening 2a, a Y axis driving mechanism 48 provided at the end of one of the guide rails 45, and an X axis driving mechanism 47 bridged between the guide rails 45. The print head 41 is connected to the X axis driving mechanism 47 so as to be capable of moving in the X direction. Further, with the Y axis driving mechanism 48, the X axis driving mechanism 47 is capable of moving in the Y direction along the guide rails 45. The X axis driving mechanism 47 and the Y axis driving mechanism 48 are composed of a ball screw mechanism, a belt mechanism, a rack-and-pinion mechanism, or the like.

As the print head 41, one having the structure of a known ink jet print head may be used. For example, inside the print head 41, a plurality of ink tanks (not shown) are provided. The ink tanks store the colors of ink, cyan, magenta, and yellow, respectively (hereinafter referred to as CMY).

Although not shown in the figures, a tank that stores, for example, transparent ink is also provided inside the print head 41. The transparent ink includes a binder for bonding and curing the powder as its component. As the binder, polyvinyl alcohol is typically used. However, the binder is not limited to polyvinyl alcohol.

As the ink, aqueous ink is, for example, used. Further, it is also possible to use ink for commercially available ink jet printers. The ink may be oily depending on the material of the powder 4.

As the system of the print head 41, a system different from an ink jet system may be employed.

The controlling unit 60 has functions as a computer including a CPU, a RAM, and a ROM. In addition, the controlling unit 60 has a display part 61 arranged at the upper area of its front surface and input operations equipment 62 arranged below the display part 61. The input operations equipment 62 is typically composed of a keyboard. The display part 61 may have an input device with a touch panel.

To the controlling unit 60, CT (Computed Tomography) data is input. Based on the input CT data or three-dimensional data obtained according to the CT data, the controlling unit 60 controls the operations of the respective parts of the molding unit 30 and the timings thereof to form a molded object.

Figure 4A:
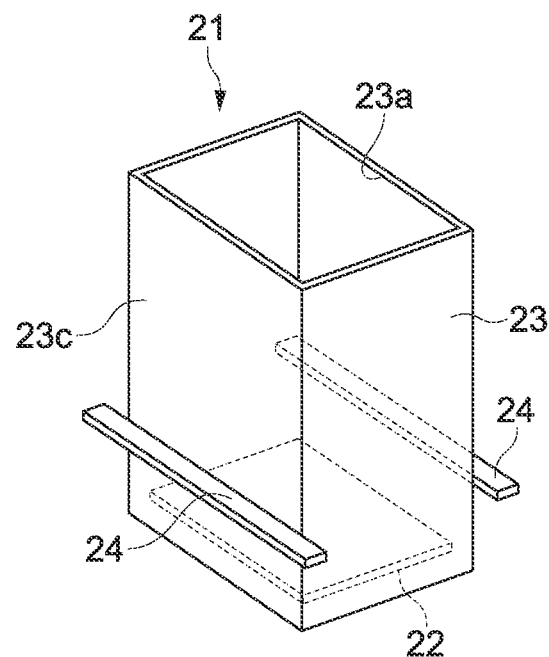
FIG. 4A is a perspective view showing a box provided in a molding part.
Figure 4B:
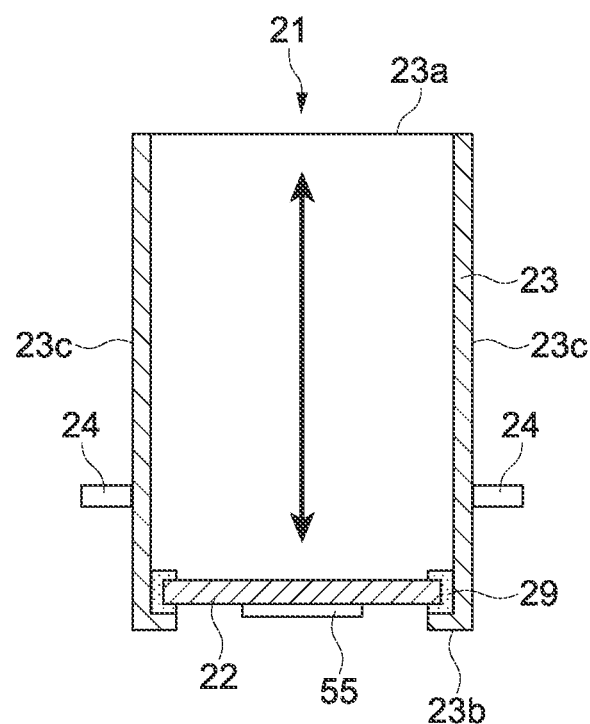
FIG. 4B is a cross-sectional view showing the box.

FIG. 4A is a perspective view showing the box 21 provided in the molding part 20. FIG. 4B is a cross-sectional view showing the box 21.

As described above, the box 21 includes the main body 23 having the opening 23a at its upper end and the stage 22 that is movably provided in the main body 23 and constitutes the bottom plate of the main body 23. The main body 23 is formed into a square cylinder, and the stage 22 is formed into a square plate so as to match the shape of the inner surface of the main body 23. As shown in FIG. 4B, a flange part 23b is provided at the lower area of the main body 23. The volume of the main body 23 becomes the greatest when the periphery of the stage 22 is mounted on the flange part 23b.

A sealing member 29 is attached to the periphery of the stage 22 and seals the gap between the main body 23 and the stage 22. The sealing member 29 is made of a sponge-like material such as urethane. At the rear surface of the stage 22, a permanent magnet 55 is, for example, attached as a member constituting part of a clamping mechanism 56 that will be described below. Note that the sealing member 29 is omitted in FIG. 2, FIGS. 7A to 7E, and the like.

At lateral surfaces 23c of the main body 23 of the box 21, supported members 24 supported by supporting members 27 (that will be described later) of the box holding mechanism 40 are provided. The supported members 24 are formed into, but not limited to, plates. The supported members 24 may only be provided at least at part of the periphery of the main body 23 in a continuous or intermittent state such that the supporting members 27 of the box holding mechanism 40 can support the box 21. According to the embodiment, the supported members 24 are provided at the pair of opposing lateral surfaces 23c of the main body 23.

As shown in FIG. 2, the box holding mechanism 40 has a pair of elevating cylinders 28 and a pair of stoppers 83. The elevating cylinders 28 and the stoppers 83 are attached and fixed to an attachment frame (not shown) provided in the molding unit 30.

The elevating cylinders 28 have respective driving parts 25 and rods 26 elevated and moved by the driving parts 25, and the tip ends of the rods 26 are attached to the supporting members 27. That is, the supporting members 27 support the supported members 24 provided at the box 21 from below. As the elevating cylinders 28, fluid pressure cylinders (typically air cylinders) are, for example, used. The driving operation of the pair of elevating cylinders 28 is controlled by a controller (not shown) of the molding unit 30 or the controlling unit 60 such that the elevating cylinders 28 are driven in synchronization with each other.

The pair of stoppers 83 has the function of restricting the upward movement of the supporting members 27 when the elevating cylinders 28 move the supporting members 27 upward. When the supported members 24 come in contact with the stoppers 83, the box 21 is positioned at the molding part 20.

Figure 5A:
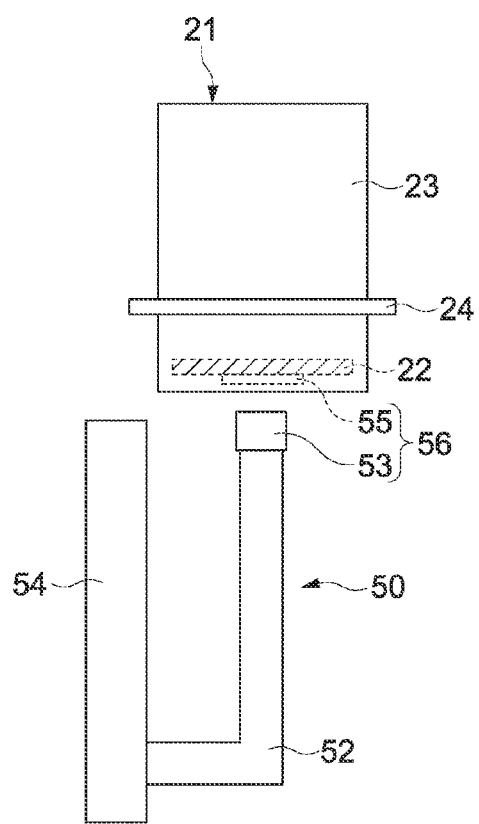
FIGS. 5A and 5B are schematic views for explaining an elevating mechanism.
Figure 5B:
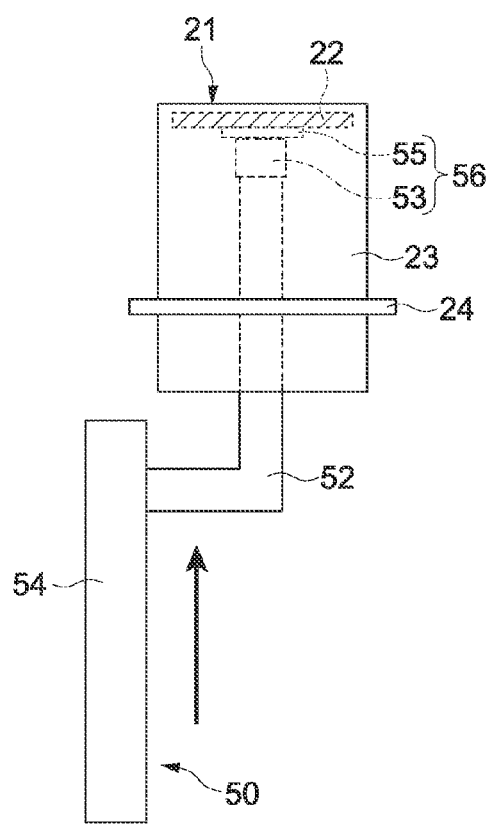

FIGS. 5A and 5B are schematic views for explaining the elevating mechanism 50.

The elevating mechanism 50 has a driving part 54, an elevating arm (elevating member) 52 elevated and moved by the driving part 54, and the clamping mechanism 56 where the elevating arm 52 clamps the stage 22. The elevating arm 52 is formed into, for example, an L-shape.

For example, the clamping mechanism 56 has a magnetic field generating device 53 attached to the upper end of the elevating arm 52 and has the permanent magnet 55 at the rear surface of the stage 22 as described above. The magnetic field generating device 53 generates a magnetic force with the energization of a coil (not shown), and the magnetic force acts on the permanent magnet 55 to connect the magnetic field generating device and the permanent magnet 55 together to clamp the stage 22. In FIG. 5B, the clamping mechanism 56 operates to clamp the elevating arm 52 to the stage 22, and the elevating arm 52 pushes the stage 22 upward.

The elevating mechanism 70 of the supplying part 10 has basically the same structure as the elevating mechanism 50 but is different from the elevating mechanism 50 in that the supplying stage 12 is directly attached to the end of an elevating arm 72.

Figure 6:
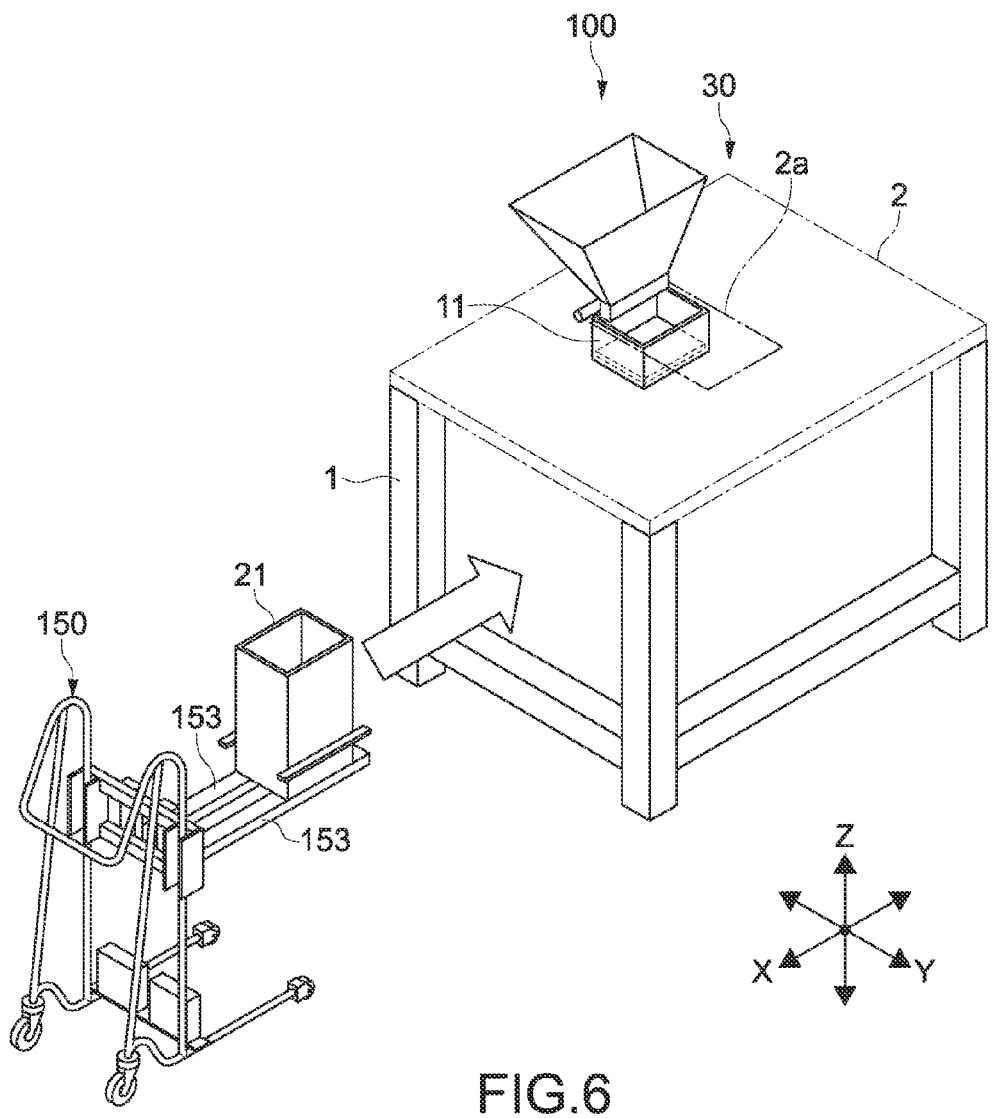
FIG. 6 shows a state where the box is conveyed by a conveying cart.

FIG. 6 shows a state where the box 21 is conveyed by a conveying cart. The conveying cart 150 has forks 153 that hold the box 21. When an operator moves the conveying cart 150 and places the forks 153 into the molding unit 30, the box 21 is arranged at a predetermined position.

(Operations Prior to Molding Processing of Molding Apparatus)

FIGS. 7A to 7E are views successively showing operations where the box 21 is loaded into the box holding mechanism 40.

First, the mechanisms of the respective parts of the molding apparatus 100 are set at their original positions (initial positions). The original position of the box holding mechanism 40 is set at the position as shown in FIG. 7A. That is, at the original position, the supporting members 27 of the elevating cylinders 28 are set at positions lower than those shown in FIG. 2.

As shown in FIG. 6, an operator moves the conveying cart 150 so as to place the forks 153 of the conveying cart 150 into the molding apparatus 100. Then, as shown in FIG. 7B, when the operator operates the molding apparatus 100 via the input operations equipment 62, the box holding mechanism 40 starts holding the box 21.

As shown in FIG. 7C, in the box holding mechanism 40, the supporting members 27 move upward with the driving operation of the elevating cylinders 28. When the supporting members 27 move upward while being in contact with the supported members 24, the box 21 is lifted and comes off from the forks 153. The elevating cylinders 28 move the supporting members 27 upward until the supported members 24 come in contact with the stoppers 83. When the supported members 24 come in contact with the stoppers 83, the upward movement of the supporting members 27 is completed. In this manner, the box holding mechanism 40 holds the box 21.

Because the elevating mechanism 50 is arranged under the box 21, the box holding mechanism 40 holding the box 21 has a very simple configuration with such a less movement.

The operator reversely moves the conveying cart 150 to pull out the forks 153 from the molding apparatus 100. The operator may pull out the forks 153 after slightly moving the forks 153 downward for safety.

Next, as shown in FIG. 7D, the elevating mechanism 50 starts operating. The elevating arm 52 moves upward, and the clamping mechanism 56 clamps the stage 22. After the stage 22 is clamped, the elevating mechanism 50 moves the stage 22 upward to the uppermost position of the main body 23 of the box 21, i.e., the position near the opening of the main body 23 as shown in FIG. 7E. Then, molding processing (see FIGS. 8A to 8D) that will be described below is started.

According to the embodiment, the box holding mechanism 40 detachably holds the box 21 as described above. Therefore, the operator can detach the box 21 from the box holding mechanism 40. The operator can extract a molded object from the detached box 21 or load the box 21 where a molded object is accommodated into a powder removing apparatus 300 that will be described below. Thus, operation efficiency can be increased.

Further, the clamping mechanism 56 according to the embodiment uses an electromagnetic clamping force. According to the embodiment, the box 21 is detachable from the box holding mechanism 40, and the stage 22 is movably provided in the main body 23 of the box 21. Therefore, it is assumed that a manufacturing error (a size error or the like) between the box 21 and the stage 22 occurs. However, compared with a case where a mechanical clamping force generated when members engage with each other is used, the use of the electromagnetic clamping force as in the embodiment of the present disclosure makes it possible to absorb the manufacturing error and clamp the stage.

(Molding Processing of Molding Apparatus)

FIGS. 8A to 8D are views successively showing mainly the molding operation of the molding apparatus 100 and are schematic views as seen from the lateral surface of the molding apparatus 100.

Before the molding apparatus 100 forms a molded object, the CT data of the object to be molded or three-dimensional data such as DICOM (Digital Imaging and Communication in Medicine) obtained according to the CT data is input to the controlling unit 60.

FIGS. 8A to 8D show, as will be described later, a process of forming one layer (corresponding to a predetermined layer thickness) where the powder 4 is cured (combined) by the ejection of the ink from the print head 41. The powder 4 and powder 4 to be cured (combined) are indicated by dotted hatching, and a cured layer is indicated by black paint.

As shown in FIG. 8A, the powder 4 is supplied from the tank shooter 15 into the supplying box 11 to be stored therein. On the stage 22 of the molding part 20, the cured layer and the powder layer to be cured are laminated. In this state, the process of forming the one cured layer is started. In FIG. 8A, the positions of the roller 16 and the print head 41 are set as their standby positions.

First, as shown in FIG. 8B, the powder 4 stuck on the supplying stage 12 of the supplying part 10 is pushed upward by the elevating mechanism 70 (see FIG. 2 or the like), such that the powder 4 slightly greater in amount than the one powder layer is supplied up to a position higher in level than a top surface 2b of the plate 2. Further, in the molding part 20, when the stage 22 is caused to fall by the elevating mechanism 50, space having a thickness of the one powder layer is provided between the top surfaces of the cured layer and the powder layer to be cured and the top surface 2b of the plate 2.

In FIG. 8B, a thickness u of the one powder layer is typically in the range of about 0.1 mm to 0.2 mm, but it may exceed or be less than the range.

As shown in FIG. 8C, when the roller 16 rotates counterclockwise and moves in the direction as indicated by a solid-white arrow, the powder 4 supplied from the supplying part 10 is conveyed. Here, the roller 16 rotates in the direction opposite to the direction in which the roller 16 is assumed to rotate with the friction between the roller 16 and the molding part 20 when the roller 16 rotates in the direction of the solid-white arrow in its rotatable state (where no torque is applied to the rotary shaft 17 of the roller 16). While being conveyed with such rotation of the roller 16, the powder 4 fills in the space provided at the top surfaces of the cured layer and the powder layer to be cured of the molding part 20. As a result, uniform powder layer is formed.

As shown in FIG. 8D, the roller 16 passes through the molding part 20 and discharges the excessive powder 4 from the discharging path member 31. Then, in synchronization with the returning operation of the roller 16 to the standby position, the print head 41 ejects the ink so as to draw a colorized image while being caused to move by the driving operation of the print head moving mechanism 46. In this case, the aqueous ink (colorized ink and transparent ink) permeates through the powder layer, and thus the powders 4 having the ink permeated therethrough are bonded together to form the cured layer (combined layer).

The print head 41 ejects the transparent ink including the binder as described above to cure (combine) the powders. That is, when the transparent ink is ejected onto the same region as the region where the colorized ink (CMY ink) is ejected, the cured layer of the colorized powders is formed.

Note that in the case of forming a non-colorized cured layer, it is only necessary for the print head 41 to selectively eject only the transparent ink onto the molding enabling region.

Note that the print head 41 may start moving and ejecting the ink after the roller 16 completes the conveyance of the powder 4 and returns to the standby position. However, because the time period of the returning operation of the roller 16 and the time period of the moving operation of the print head 41 overlap each other as described above, the processing time can be reduced.

When the print head 41 returns to the standby position, the process returns to the state shown in FIG. 8A where a colorized cured object corresponding to one layer is formed. Through the repetitive operations described above, the molding apparatus 100 laminates the cured layers together to form the molded object.

It may also be possible to obtain a molded object having higher hardness in such a manner that the molded object is heated by a heating apparatus (not shown) other than the molding apparatus 100.

After the molding processing of the molding apparatus 100, the operator detaches the box 21 from the molding unit 30. The detachment of the box 21 only needs to be performed in an order reverse to the order described in FIGS. 7A to 7E. The operator only needs to pull out the forks 153 of the conveying cart 150 holding the box 21 from the molding apparatus 100 and directly convey the conveying cart 150 to the powder removing apparatus 300 that will be described below.

Figure 9:
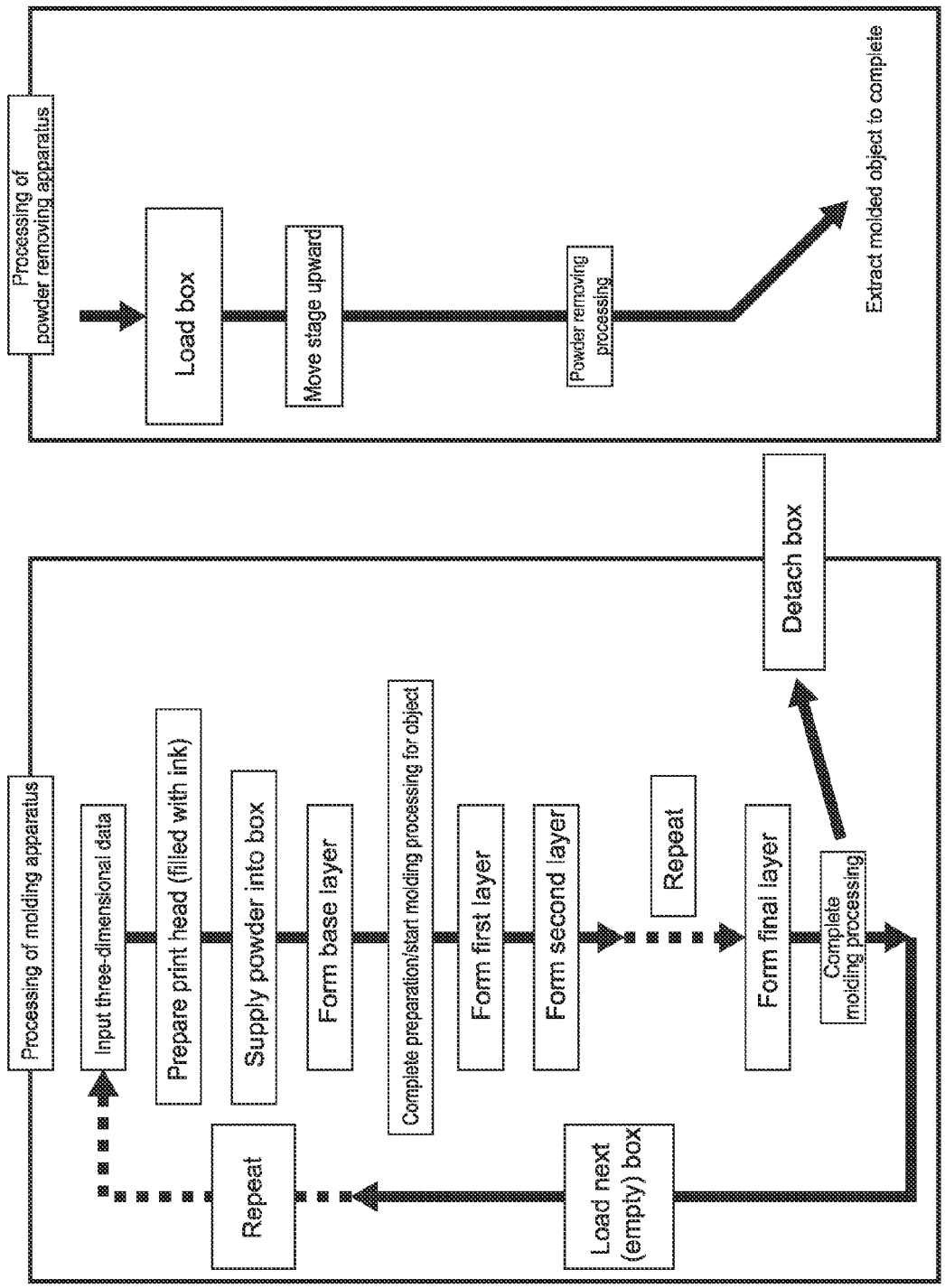
FIG. 9 is a flowchart showing the processing of the molding apparatus and that of a powder removing apparatus.

The processing of the molding apparatus 100 described above is shown on the left side of FIG. 9 as a flowchart.

(Powder Removing Apparatus)

Next, the powder removing apparatus will be described.

(Powder Removing Apparatus According to First Embodiment)

Figure 10:
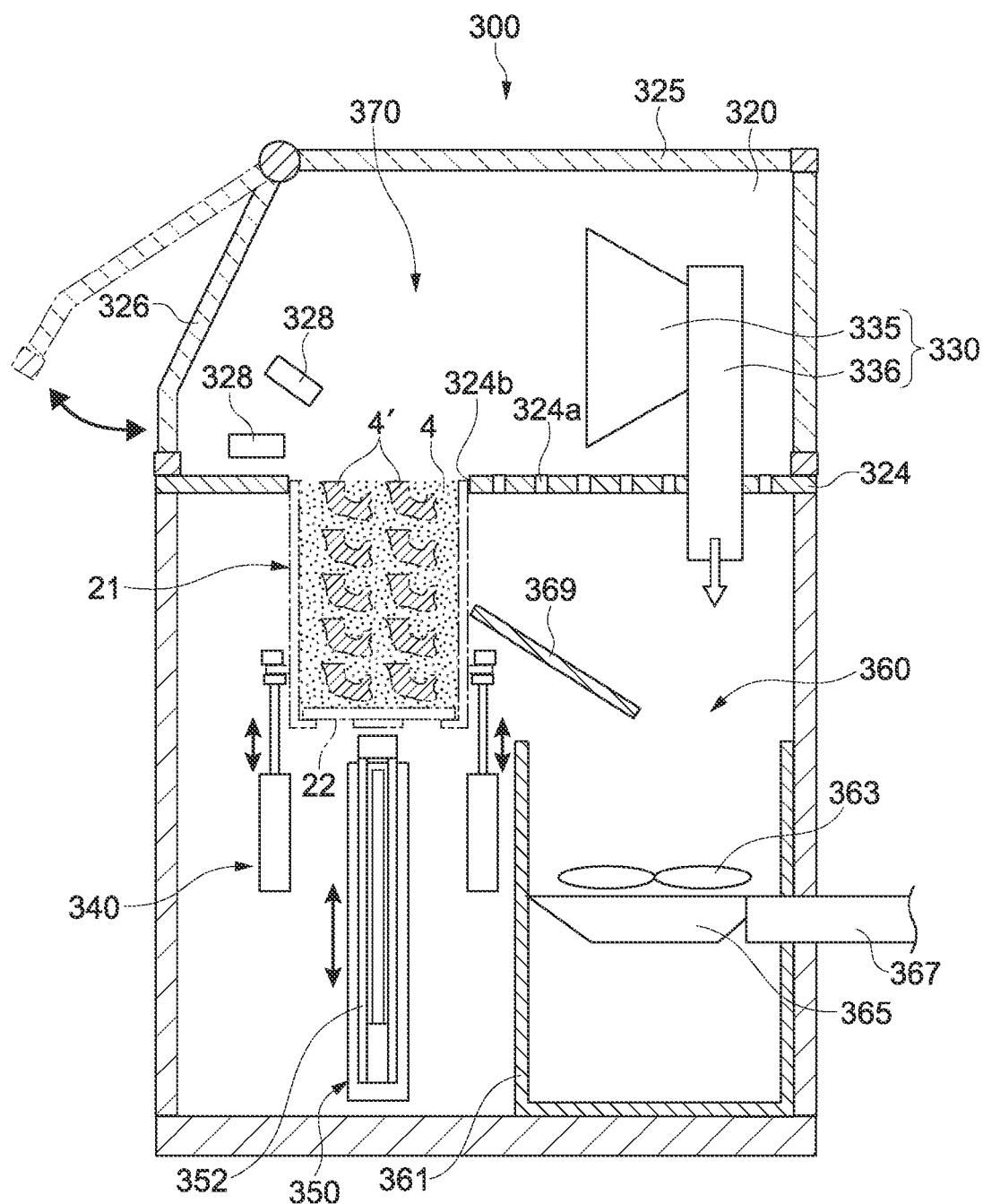
FIG. 10 is a schematic cross-sectional view showing the powder removing apparatus according to a first embodiment.

FIG. 10 is a schematic cross-sectional view showing the powder removing apparatus according to a first embodiment.

The powder removing apparatus 300 has a box holding mechanism 340 detachably holding the box 21 and a stage moving mechanism 350 that elevates and moves the stage 22 of the box 21 held by the box holding mechanism 340. In addition, the powder removing apparatus 300 has a powder removing processing mechanism 370 that removes non-bonding powder 4 existing around a molded object 4'.

The powder removing apparatus 300 has a supporting housing 362 and a covering member 325 that forms a powder removing chamber (powder removing operating region) 320 on the supporting housing 362. A partition plate 324 is provided on the supporting housing 362. The powder removing chamber 320 is formed by the partition plate 324 and the covering member 325.

The covering member 325 is mainly made of, for example, a transparent acrylic resin or the like. The front of the covering member 325 is formed into a door 326 capable of opening and closing in a vertical direction. The covering member 325 is subjected to anti-static processing to prevent its visibility from being degraded due to the attachment of static-charged powder.

The powder removing processing mechanism 370 has gas-blowing nozzles 328 arranged inside the powder removing chamber 320 and an exhausting apparatus 330 that collects and exhausts powder. The exhausting apparatus 330 has an exhausting hood 335 that is arranged inside the powder removing chamber 320 and includes an exhausting fan. In addition, the exhausting apparatus 330 has an exhausting pipe 336 connected to the exhausting hood 335. The exhausting apparatus 330 serves as an attracting mechanism.

As shown in FIG. 10, the plurality of nozzles 328 may be provided. As gas to be ejected from the nozzles 328, air is typically used. However, an inert gas such as nitrogen may be used. Although not shown, the nozzles 328 are connected to a tank where the gas is accommodated via pumps, valves, and the like. At least the nozzles 328 serve as the powder removing processing mechanism 370. The powder removing processing mechanism 370 may include the exhausting apparatus 330.

Under the partition plate 324, the box holding mechanism 340, a powder collecting part 360 adjacent to the box holding mechanism 340, and the stage moving mechanism 350 are arranged. The exit of the exhausting pipe 336 of the exhausting apparatus 330 is arranged below the partition plate 324, and the powder exhausted from the exhausting pipe 336 is collected into the powder collecting part 360.

In some region of the partition plate 324, a plurality of holes 324a are formed. The powder accumulated on the partition plate 324 falls from the holes 324a, slides off a slanted plate 369 arranged below the partition plate 324, and is collected into the powder collecting part 360.

In the partition plate 324, an opening 324*b* formed into a shape corresponding to the outer shape or the inner diameter of the box 21 is provided. In a state where the box 21 is supported by the box holding mechanism 340, the upper area of the main body 23 of the box 21 is inserted into the opening 324*b* or comes in contact with the periphery of the opening 324*b*.

The powder collecting part 360 has a collecting container 361 that forms a collecting region, a stirring mechanism 363 provided inside the collecting container 361, a sieving mechanism 365 that is provided under the stirring mechanism 363 and collects a foreign substance, and a foreign substance removing mechanism 367 that removes the foreign substance collected by the sieving mechanism 365.

The stirring mechanism 363 has a rotating body with a plurality of blades, a motor that drives the rotating body, and the like. The sieving mechanism 365 has a filtering member vibrated by, for example, a driving part (not shown). The foreign substance removing mechanism 367 is connected to the sieving mechanism 365 and exhausts the foreign substance using, for example, an exhausting fan (not shown) or the like. Examples of the foreign substance include materials other than the powder and lumps of the powders generated when a molded object is cracked or broken.

Because the box holding mechanism 340 has substantially the same structure and function as the box holding mechanism 40 of the molding apparatus 100, the description of the structure and the function of the box holding mechanism 340 will be omitted. Further, because the stage moving mechanism 350 substantially has the same structure and function as the elevating mechanism 50 of the molding apparatus 100, the description of the structure and the function of the stage moving mechanism 350 will be omitted. However, the box holding mechanism 340 and the stage moving mechanism 350 may have structures different from those of the box holding mechanism 40 and the elevating mechanism 50 of the molding apparatus 100.

The box 21 is the one that has been loaded into the molding apparatus 100. As described above, the box 21 conveyed from the molding apparatus 100 by the conveying cart 150 is loaded into the powder removing apparatus 300.

Figure 11:
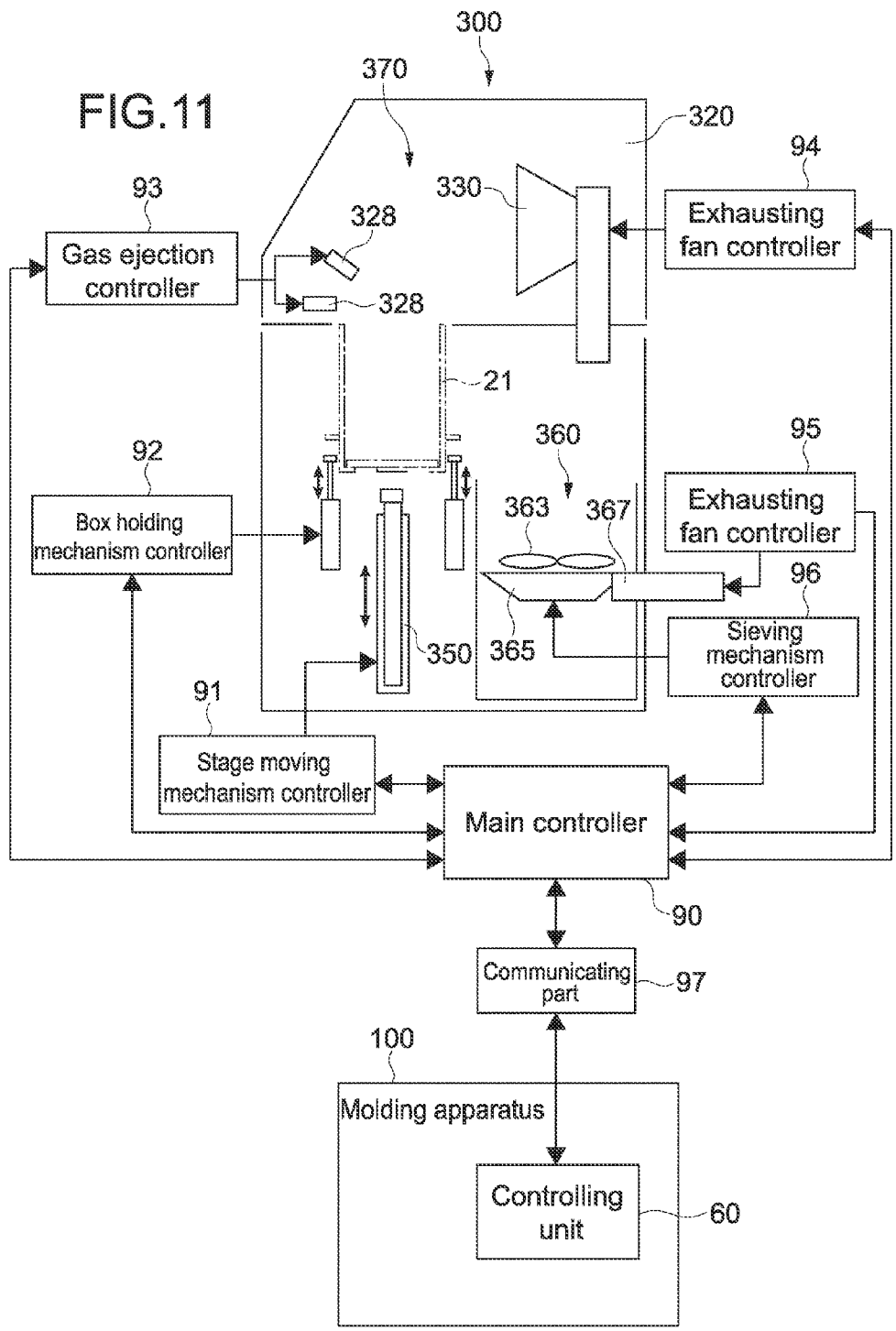
FIG. 11 is a block diagram showing the configuration of the controlling system of the powder removing apparatus.

FIG. 11 is a block diagram showing the configuration of the controlling system of the powder removing apparatus 300.

The controlling system has a main controller 90, a stage moving mechanism controller 91, a box holding mechanism controller 92, a gas ejection controller 93, an exhausting fan controller 94, an exhausting fan controller 95, a sieving mechanism controller 96, and a communicating part 97.

The main controller 90 collectively controls the respective controllers 91 to 96 and the communicating part 97. The stage moving mechanism controller 91 controls the driving operation of the stage moving mechanism 350. The box holding mechanism controller 92 controls the driving operation of the box holding mechanism 340. The gas ejection controller 93 controls the ON/OFF switching operation of the gas ejected from the nozzles 328 or the flow rate of the gas. The exhausting fan controllers 94 and 95 control, for example, the number of rotations of the respective fans to control their exhausting amounts. The sieving mechanism controller 96 controls at least one of the amplitude of a sieve and the frequency of the sieve.

The communicating part 97 is communicably connected to the controlling unit 60 of the molding apparatus 100 in a wired or wireless manner.

The main controller 90 is implemented by hardware elements used in a computer, such as a CPU, a RAM, and a ROM, and software. Alternatively, the controlling unit 60 may be implemented by a PLD (Programmable Logic Device) such as an FPGA (Field Programmable Gate Array), a device such as an ASIC (Application Specific Integrated Circuit), or the like.

Further, the respective controllers other than the main controller 90 and the communicating part 97 are composed of hardware or both hardware and software.

Figure 12:
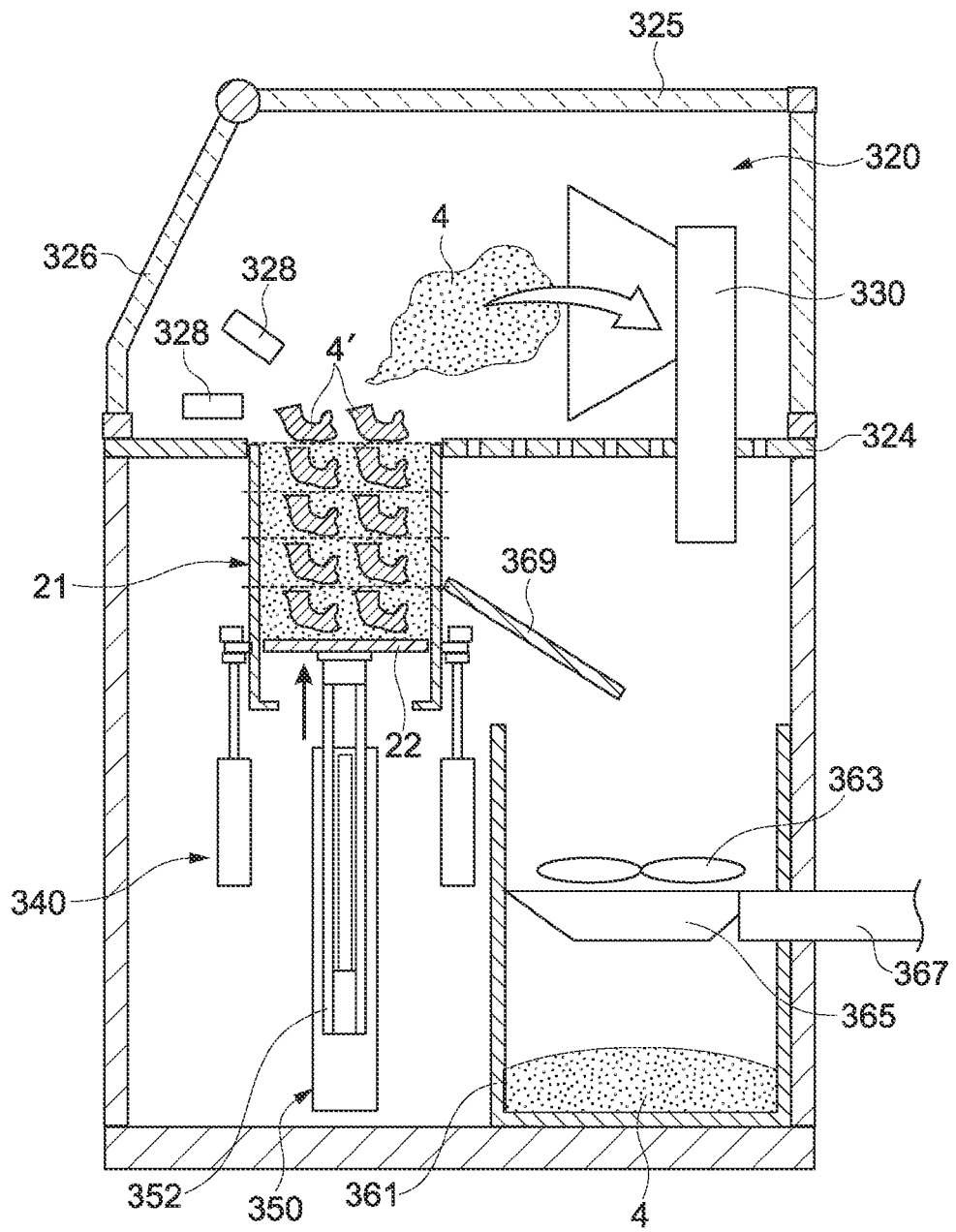
FIG. 12 is a view for explaining part of the operations of the powder removing apparatus.

Next, the operations of the powder removing apparatus 300 thus configured will be described. FIG. 12 is a view for explaining part of the operations of the powder removing apparatus 300.

The operator loads the conveying cart 150 holding the box 21 where molded objects are accommodated into the box holding mechanism 340 of the powder removing apparatus 300. Because the operator loads the conveying cart 150 in the same manner as that when the operator loads the box 21 into the molding apparatus 100, the description of the method of loading the conveying cart 150 will be omitted.

Prior to powder removing processing, the main controller 90 of the powder removing apparatus 300 acquires related information related to the molded objects accommodated inside the loaded box 21 from the controlling unit 60 of the molding apparatus 100. In this case, the main controller 90 serves as an "acquiring part."

The related information includes three-dimensional data on the objects to be molded, the number of molded objects arranged inside the box 21, and information on the number of shelves of the molded objects in a vertical direction. The related information may include information on the powder, the type of the ink, or the like. The operator only needs to perform an operation for acquiring the related information via an operations part (not shown) of the powder removing apparatus 300.

As shown in FIG. 12, the elevating arm 352 of the stage moving mechanism 350 moves upward by a predetermined height according to the control of the stage moving mechanism controller 91. Here, the predetermined height substantially refers to, when the plurality of molded objects 4' are arranged on the plurality of shelves in the vertical direction, the height of the one molded object 4'. As described above, the main controller 90 acquires the related information from the controlling unit 60. Therefore, the main controller 90 can recognize the height of the one molded object 4'. In this case, the main controller 90 mainly serves as a "controlling part."

In FIG. 12, the plurality of shelves are divided by dashed lines to show the height of the molded object 4' on each of the shelves. With the upward movement of the stage 22 by the elevating arm 352 as described above, the molded object 4' on the uppermost shelf is extruded from the box 21 via the opening 23*a* (see FIGS. 4A and 4B) of the main body 23.

Then, the exhausting apparatus 330 starts operating according to the control of the exhausting fan controller 94. The gas is ejected from the nozzles 328 at a predetermined flow rate according to the control of the gas ejection controller 93, and mainly the non-bonding (non-curing) powder 4 existing around the molded object 4' is scattered so as to get away from the molded object 4'. That is, the non-bonding powder 4 is removed from the molded object 4'. After that, the powder 4 is transferred to the powder collecting part 360 via the exhausting apparatus 330. With the use of the nozzles 328 that eject the gas as described above, powder removing precision is increased.

When the powder removing processing with respect to the molded object 4' on the uppermost shelf of the box 21 is completed, the operator or a robot opens the door 326 and extracts the molded object 4' from the uppermost shelf. During the extraction of the molded object 4', the exhausting fan controller 94 may temporarily stop operating the exhausting apparatus 330 or continue to operate the exhausting apparatus 330 without interruption.

After the extraction of the molded object 4' from the uppermost shelf by the operator or the robot, the door 326 of the powder removing chamber 320 is closed, and the elevating arm 352 of the stage moving mechanism 350 moves upward by the predetermined height. Then, similar to the case of the molded object 4' on the uppermost shelf, the powder existing around the molded object 4' accommodated on the second shelf of the box 21 is removed.

The powder removing apparatus 300 repeatedly performs the operations described above a number of times corresponding to the number of shelves of the molded objects 4' accommodated inside the box 21.

After the extraction of the molded object 4' from the lowermost shelf of the box 21 by the operator or the robot, the box 21 is detached from the powder removing apparatus 300. Because the operator detaches the box 21 from the powder removing apparatus 300 in the same manner as that when the operator detaches the box 21 from the molding apparatus 100, the description of the method of detaching the box 21 from the powder removing apparatus 300 will be omitted.

The operator extracts the empty box 21 from the conveying cart 150 holding the empty box 21 or conveys the conveying cart 150 holding the empty box 21 to a predetermined position.

The processing of the powder removing apparatus 300 described above is shown on the right side of FIG. 9 as a flowchart.

As described above, according to the embodiment, the powder removing apparatus 300 removes the non-bonding powder 4 from the individual box 21 where the molded objects 4' formed by the molding apparatus 100 are accommodated. Therefore, it is possible to prevent the inside of the molding apparatus 100 from becoming soiled by the powder 4. That is, in a general powder-based rapid prototyping apparatus that does not use the detachable box 21 as in the embodiment of the present disclosure, a molding part (a head, a moving mechanism that moves the head, or the like) for a molded object becomes soiled by non-bonding powder because powder is scattered when an operator extracts the molded object buried in the powder from a box. However, the embodiment of the present disclosure can solve such a problem.

According to the embodiment, the stage moving mechanism 350 moves upward the stage 22 provided inside the box 21 to extrude the molded object 4' from the box 21 via the opening 23*a* of the main body 23. Thus, the new powder removing apparatus 300 capable of removing the non-bonding powder 4 from the upper part of the box 21 can be provided.

On the other hand, in a molding apparatus according to a reference example for comparison with the embodiment of the present disclosure, non-bonding powder is discharged from below a box so that it falls due to its own weight. In the case of such an apparatus, it is necessary for an operator to extract a molded object from the box and manually perform a powder removing operation, which takes much time and trouble.

Further, in a molding apparatus (molding apparatus according to a reference example for comparison with the embodiment of the present disclosure) where a plurality of molded objects are formed inside a box and powder is discharged at one time, the order and the arrangement of the plurality of molded objects are random. Under such a circumstance, for example, if the plurality of molded objects are similar in shape but are slightly different from each other, it may be impossible for an operator to discriminate the molded objects one from another.

Further, when the powder is discharged at one time from the molding apparatus, the molded objects rotate and collide against each other. Therefore, there is a likelihood of the molded objects being damaged (broken, cracked, and deformed).

According to the embodiment of the present disclosure, the plurality of molded objects 4' accommodated on the plurality of shelves are extruded one by one from the main body 23, and the powder is removed from the upper part of the box 21. Therefore, compared with, for example, the case where the powder existing inside the box is removed at one time, it is possible to individually discriminate the plurality of molded objects 4' from one another and successively extract them from above. Accordingly, the problems in the molding apparatuses according to the reference examples described above can be totally solved.

According to the embodiment, the sieving mechanism 365 and the foreign substance removing mechanism 367 remove a foreign substance from the powder. Therefore, it is possible to collect the non-bonding powder from which the foreign substance is removed and recycle the powder.

According to the embodiment, with the preparation of the plurality of boxes 21, it is possible to perform the molding processing on the molded objects inside one of the plurality of boxes 21 with the molding apparatus 100 while performing the powder removing processing on the molded objects inside another of the boxes 21 with the powder removing apparatus 300. Unlike an apparatus where a molding processing part and a powder removing processing part are, for example, integrally provided, such a molding system can reduce time during which the molding processing is suspended and increase productivity for the molded objects. As a result, the cost of the molding processing can also be reduced.

Further, the molding apparatus 100 and the powder removing apparatus 300 are separate apparatuses. Therefore, the maintenance of the respective apparatuses can be separately performed.

(Powder Removing Apparatus According to Second Embodiment)

Figure 13:
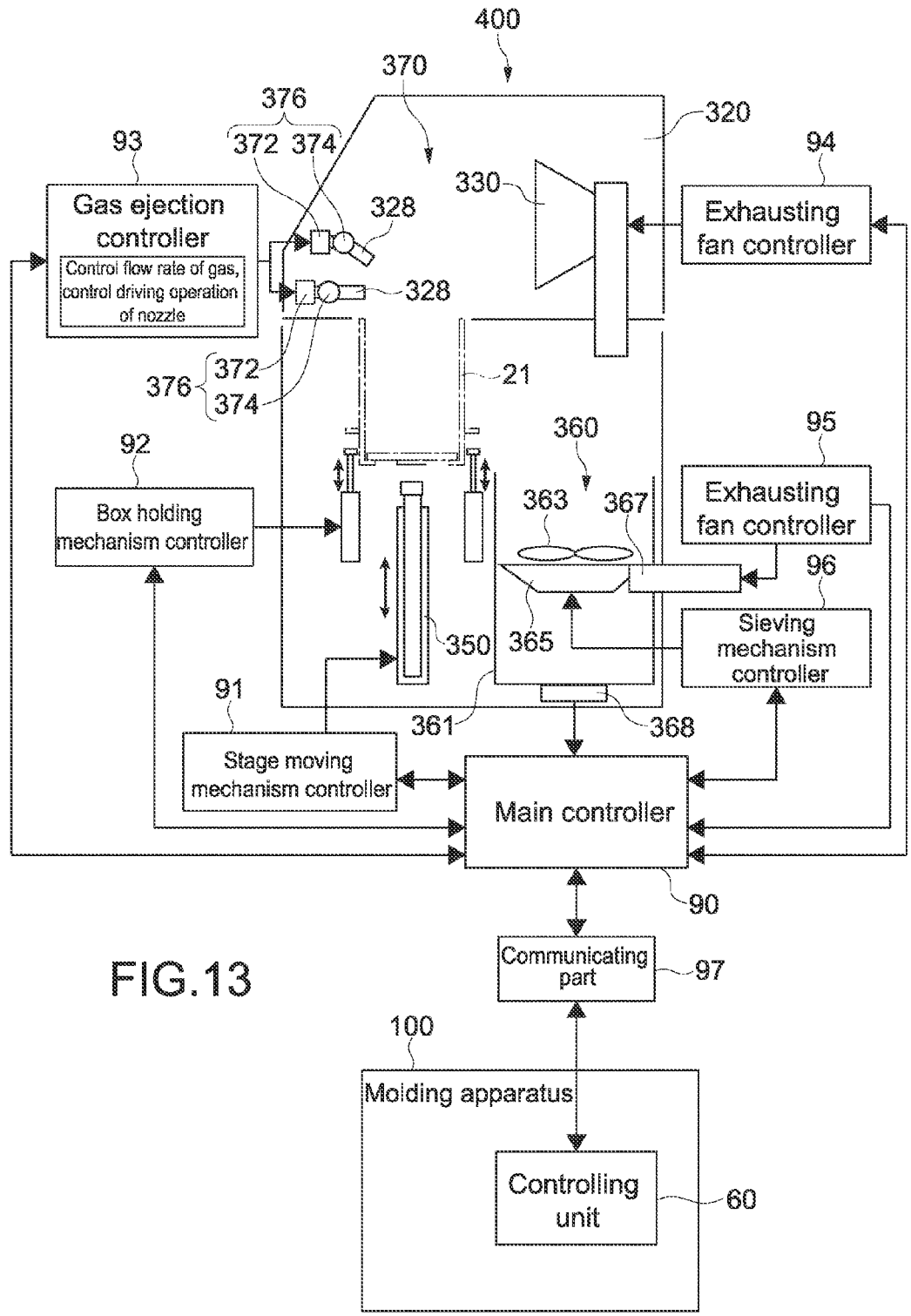
FIG. 13 is a diagram showing the schematic configuration of a powder removing apparatus according to a second embodiment and the block configuration of the controlling system thereof.

FIG. 13 is a diagram showing the schematic configuration of a powder removing apparatus according to a second embodiment and the block configuration of the controlling system thereof. In the following description, the same members, functions, blocks, and the like as the powder removing apparatus 300 according to the first embodiment shown in FIGS. 10 and 11 will be simplified or omitted, and mainly different points will be focused.

The powder removing apparatus 400 according to the embodiment has nozzle driving mechanisms 376 that drive the respective nozzles 328. The nozzle driving mechanisms 376 have, for example, respective translational movement mechanisms 372 and angle adjusting mechanisms 374.

The translational movement mechanisms 372 translationally move the respective nozzles 328 along the one-dimensional (for example, an X axis) direction in FIG. 10. As the translational movement mechanisms 372, ball screw mechanisms or the like are used. The translational movement mechanisms 372 individually drive the respective nozzles 328.

In order to change the ejecting directions of the nozzles 328, the angle adjusting mechanisms 374 are connected to the nozzles 328 in a manner capable of adjusting the angles (postures) of the nozzles 328. The angle adjusting mechanisms 374 may be manually adjusted by an operator. Alternatively, the angle adjusting mechanisms 374 may include respective motors, gears, and the like and be capable of (automatically) adjusting the angles of the nozzles 328 according to electric control. In the following description, the embodiment will be given using the angle adjusting mechanisms 374 as the mechanisms that adjust the angles of the nozzles 328 according to the electric control.

The gas ejection controller 93 controls the driving operations of the nozzle driving mechanisms 376.

Note that in FIG. 13, the translational movement mechanisms 372 are individually provided for the nozzles 328. However, one nozzle driving mechanism may be provided and collectively drive the plurality of nozzles 328. Alternatively, a mechanism may be provided that translationally moves the nozzles not only in the one-dimensional direction along the X axis but also in a two-dimensional direction including the Y axis or the Z axis or in a three-dimensional direction including both the X axis and the Y axis or the Z axis. In this case, it is only necessary for the moving mechanism to have moving axes corresponding to the number of arbitrary dimensions according to the mode (the shape, the arrangement, and the number, or the like) of the nozzles 328. For example, if a plurality of nozzles are arranged along the X axis direction, a mechanism that translationally moves the nozzles along the X axis direction does not need to be provided. Alternatively, one ejection head having a plurality of nozzles (or the plurality of ejection heads) may be provided inside the powder removing chamber 320.

Further, the powder removing apparatus 400 has a weight sensor 368 that detects the weight of the collecting container 361. The weight sensor 368 detects the weight of the non-bonding powder 4 collected into the collecting container 361 having a predetermined weight. The main controller 90 is capable of acquiring information detected by the weight sensor 368.

At the powder removing processing, the powder removing apparatus 400 thus configured extrudes molded objects on shelves one by one from the box 21 and removes non-bonding powder as in the first embodiment. At this time, the gas ejection controller 93 controls the nozzle driving mechanisms 376 according to related information, particularly three-dimensional data, on the molded objects acquired from the controlling unit 60 via the main controller 90. The nozzle driving mechanisms 376 perform at least one of the translational movements of the nozzles 328 and the adjustment of the angles of the nozzles 328 according to the shapes of the molded objects. With such driving control, the gas is ejected from positions most suitable for the powder removing processing Moreover, the gas ejection controller 93 can control the ejection of the gas so that it takes longer time or the gas is ejected at a greater flow rate for performing the powder removing processing on molded objects having complicated shapes (the molded objects having first surface areas), compared with a case where the powder removing processing is performed on molded objects having uncomplicated shapes (molded objects having second front surface areas smaller than the first front surface areas). As described above, because the three-dimensional data used for forming the molded objects is used, it is not necessary for the main controller 90 to generate separate information. In addition, because the powder removing processing is finely performed according to the three-dimensional data, powder removing precision is increased.

According to the embodiment, the main controller 90 determines progress on the powder removing processing of the powder removing processing mechanism 370 according to the information detected by the weight sensor 368. In this case, the main controller 90 and the weight sensor 368 serve as a "determining part."

For example, if the value detected by the weight sensor 368 is less than or equal to a threshold, the main controller 90 continues to perform the powder removing processing. On the other hand, if the value exceeds the threshold, the main controller 90 stops the powder removing processing. The stop of the powder removing processing refers to, for example, stopping the operation of the exhausting apparatus 330, stopping the ejection of the gas from the nozzles, or the like. The threshold refers to a value set based on, for example, the volume of the box 21, the volumes of the molded objects 4', or the like. Further, the volumes of the molded objects 4' can be calculated based on the three-dimensional data acquired by the controller 90 from the controlling unit 60.

As described above, the main controller 90 can recognize the progress on the powder removing processing based on the measured amount of the non-bonding powder.

(Third Embodiment)

Although not shown, a powder removing apparatus according to a third embodiment has a sensor that detects the degree of clearness of air inside the powder removing chamber 320. As the sensor, an optical sensor is, for example, used.

The optical sensor may be a transmission type or a reflection type that detects scattered light. The sensor may be an image sensor. During the powder removing processing, the degree of clearness of the air inside the powder removing chamber 320 is low because the powder rises into the powder removing chamber 320. However, if a predetermined degree of clearness of the air is obtained, it can be used as a trigger for completing the powder removing processing. The main controller 90 can recognize progress on the powder removing processing based on the information detected by the sensor.

(Other Embodiments)

The present disclosure is not limited to the embodiments described above and can achieve various other embodiments.

According to the embodiments described above, the boxes 21 are detachably provided. However, the boxes 21 may be fixed to the molding apparatus and the powder removing apparatus. For example, it may be possible that the plurality of boxes 21 are provided in the powder removing apparatus (or the molding apparatus) and that the powder removing apparatus has a mechanism where the plurality of boxes 21 collectively move in a horizontal plane. The mechanism where the plurality of boxes 21 collectively move in the horizontal plane may be, for example, a rotating mechanism where the boxes 21 rotate (revolve) about a point. At least one of the boxes 21 arranged at a predetermined position is to be subjected to the powder removing processing according to the powder removing processing method described above (subjected to the molding processing according to the molding processing method described above).

If the molding apparatus or the powder removing apparatus has the mechanism where the plurality of boxes 21 collectively move in the horizontal plane, the boxes 21 may be, of course, detachably provided in the apparatus.

Each of the powder removing apparatuses described above may have, instead of or in addition to the nozzles 328 that eject the gas, a device such as a brush that comes in physical contact with the molded objects 4 and removes the non-bonding powder 4' existing around the molded objects 4.

In each of the powder removing apparatuses described above, the main controller can also control the upward-movement speed of the stage 22, the method of moving the stage 22 upward, the number of nozzles 328 for use in the powder removing processing, or the like.

As the mechanisms of the main parts in the box holding mechanisms 40 and 340 described above, the fluid pressure cylinders are used. However, instead of the fluid pressure cylinders, ball screw mechanisms, rack-and-pinion mechanisms, belt mechanisms, or the like may be used.

In the powder removing apparatus according to the second embodiment, the weight sensor is provided as the device that measures the amount of the powder. However, the device is not limited to the weight sensor. For example, an image sensor or an optical sensor may detect how deep the powder 4 is accumulated inside the collecting container, and the main controller may calculate the amount (weight or volume) of the powder based on the detected information.

Each of the powder removing apparatuses described above may have identifiers for identifying the boxes 21 in each of the boxes 21, instead of or in addition to the method of acquiring the three-dimensional shape data from the molding apparatus 100. Examples of the identifiers include IC tags and information codes (such as barcodes and two-dimensional information codes). As a result, each of the powder removing apparatuses can control the powder removing processing for each of the boxes 21 or for each of the molded objects accommodated inside the boxes 21.

In the above description related to each of the powder removing apparatuses, the plurality of molded objects are accommodated inside the box 21. However, even if one molded object 4' is accommodated inside the box 21, non-bonding powder 4 existing around the molded object 4' only needs to be removed by the continuous or intermittent ejection of the gas from the nozzles 328 while the elevating arm 352 moves the stage 22 upward in stages (intermittently). Alternatively, the non-bonding powder 4 may be removed while the elevating arm 52 continuously moves the stage 22 upward. Even if the stage 22 is continuously moved upward like this, the powder removing apparatus 300 can variably control the upward movement speed of the stage 22 according to three-dimensional shape data as described above.

As the clamping mechanism 56 according the embodiment described above, an electromagnetic clamp is used. However, as the clamping mechanism, a mechanism that generates a clamping force with capacitance or a mechanism that generates a clamping force with mechanical engagement may be used.

As the elevating members of the elevating mechanisms 50 and 70, the L-shaped elevating arms are exemplified in the embodiments described above. However, the elevating members are not limited to such an L-shape and may be formed into any shape such as a rod shape. The same applies to the stage moving mechanism 350.

The shape of the box is not limited to the square cylinder as in the embodiment described above and may be a triangle cylinder, a cylinder of pentagon or more, a cylinder, an elliptic cylinder, a combination of at least two of these cylinders, or any other shapes.

According to the embodiment described above, the molding apparatus 100 and the powder removing apparatus 300 are separately provided. However, they may be integrally provided.

Alternatively, the present disclosure is also applicable to a molding system where the molding apparatus 100 and the powder removing apparatus 300 are arranged inline regardless of whether they are integrally provided or separately provided and an automatic conveying apparatus conveys the box 21 between the molding apparatus 100 and the powder removing apparatus 300. As the automatic conveying apparatus, an AGV (Automatic Guided Vehicle) such as an RGV (Rail Guided Vehicle) and a PGV (Personal Guided Vehicle) is, for example, used.

As the automatic conveying apparatus, a conveying apparatus having no wheels such as an arm-and-hand may be, for example, used. In this case, the molding apparatus 100 and the powder removing apparatus 300 may be configured as an integrated apparatus together with such a conveying apparatus having no wheels.

It may also be possible to prepare boxes having different volumes according to at least the sizes of molded objects among three-dimensional shape data on the molded objects. For example, in the case of forming a small molded object, the controlling unit 60 of the molding apparatus 100 selects a small box corresponding to the small molded object and performs the molding processing using the small box. Thus, the use amount of the powder can be saved compared with a case where boxes having the same volume are used. In this case, the outer shapes of the boxes and the sizes thereof may be substantially the same among the boxes, and the boxes only need to be formed so as to have different volumes.

As the powder, metal and a resin may be used besides the materials described above. In the case of using metal powder, the metal powder can be bonded (cured) by sintering. In order to selectively sinter the metal powder existing in the molding enabling region, laser light is used.

Further, in a case where metal powder having magnetic properties is used and an electromagnetic clamp as in the embodiment described above is used as the clamping mechanism 56, a magnetic shield that interrupts the magnetic field between the upper surface and the lower (rear) surface of the stage 22 only needs to be provided.

The elevating mechanism 50 elevates and moves the stage 22 relative to the main body 23. However, the elevating mechanism 50 may elevate and move the main body 23 relative to the stage 22. The stage moving mechanism 350 of the powder removing apparatus 300 also elevates and moves the stage 22 relative to the main body 23. However, the stage moving mechanism 350 may elevate and move the main body 23 relative to the stage 22. In this case, the stage moving mechanism 350 may gradually move the main body 23 downward in a state where the lower end of the box 21 is positioned at a height near the partition plate 324.

According to the embodiment described above, the controlling unit 60 of the molding apparatus 100 and the communicating part 97 of the powder removing apparatus 300 are communicably connected to each other. However, a computer as a server may be communicably connected to the molding apparatus 100 and the powder removing apparatus 300 and manage the same.

Among the features of the respective embodiments described above, at least two of them may be combined together.

Note that the present disclosure may also employ the following configurations.

(1) A powder removing apparatus, including:
a box having a main body with an opening and a stage movably provided in the main body,
the box being capable of accommodating a molded object and non-bonding powder so as to arrange the molded object, which is formed using powder according to a rapid prototyping technique, on the stage together with the non-bonding powder;
a stage moving mechanism capable of moving the stage upward relative to the main body inside the main body; and
a powder removing processing mechanism configured to remove the non-bonding powder existing around the molded object extruded by a driving operation of the stage moving mechanism via the opening.

(2) The powder removing apparatus according to (1), in which
the box is capable of vertically accommodating a plurality of molded objects on a plurality of shelves, and
the powder removing apparatus further includes
a controlling part configured to
operate the stage moving mechanism such that corresponding one of the plurality of molded objects accommodated on the plurality of shelves is extruded from the main body for each of the plurality of shelves, and
operate the powder removing processing mechanism for each of the plurality of shelves.

(3) The powder removing apparatus according to (1), further including:
an acquiring part configured to acquire related information related to the molded object inside the main body of the box; and
a controlling part configured to operate the powder removing processing mechanism based on the acquired related information.

(4) The powder removing apparatus according to (3), in which
the acquiring part is configured to acquire at least three-dimensional data on the object to be molded for use in the rapid prototyping technique as the related information.

(5) The powder removing apparatus according to (4), in which
the powder removing processing mechanism includes
a nozzle configured to eject gas onto the molded object, and
a nozzle driving mechanism configured to variably drive at least one of a position and a posture of the nozzle according to control of the controlling part based on the three-dimensional data.

(6) The powder removing apparatus according to any one of (1) to (5), in which
the powder removing processing mechanism includes
a powder removing operating region,
a nozzle configured to eject gas onto the molded object, and
an attracting mechanism configured to attract the non-bonding powder existing in the powder removing operating region.

(7) The powder removing apparatus according to (1), further including:
a determining part configured to determine progress on powder removing processing of the powder removing processing mechanism.

(8) The powder removing apparatus according to (7), in which
the determining part includes a sensor configured to detect an amount of the non-bonding powder collected from the powder removing processing mechanism.

(9) The powder removing apparatus according to (7), in which
the determining part includes a sensor configured to detect a degree of clearness of air inside a powder removing operating region of the powder removing processing mechanism.

(10) The powder removing apparatus according to any one of (1) to (9), further including:
a sieving mechanism configured to remove a foreign substance from the non-bonding powder collected from the powder removing processing mechanism.

(11) The powder removing apparatus according to any one of (1) to (10), further including:
a supporting mechanism configured to detachably support the box.

(12) A molding system, including:
a molding apparatus configured to form a molded object using powder according to a rapid prototyping technique; and
a powder removing apparatus including
a box having a main body with an opening and a stage movably provided in the main body,
the box being capable of accommodating the molded object and non-bonding powder so as to arrange the molded object formed by the molding apparatus on the stage together with the non-bonding powder,
a stage moving mechanism capable of moving the stage upward relative to the main body inside the main body, and
a powder removing processing mechanism configured to remove the non-bonding powder existing around the molded object extruded by a driving operation of the stage moving mechanism via the opening.

(13) A method of manufacturing a molded object, including:
forming the molded object using powder according to a rapid prototyping technique;
moving a stage upward relative to a box inside a main body of the box,
the box having the main body with an opening and the stage movably provided in the main body,
the box being capable of accommodating the molded object and non-bonding powder so as to arrange the molded object on the stage together with the non-bonding powder; and
removing the non-bonding powder existing around the molded object extruded by the upward movement of the stage via the opening of the box.

The present disclosure contains subject matter related to that disclosed in Japanese Priority Patent Application JP 2011-186676 filed in the Japan Patent Office on Aug. 30, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus, comprising:
a chamber with a floor, the floor having an opening;
a box having a main body with an opening and a stage movable within the main body, the box being capable of accommodating therein a formed object and non-bonded powder on the stage within the box;
a box holding mechanism to hold the box in registration with the opening in the floor of the chamber;
a stage moving mechanism capable of controllably moving the stage vertically inside the main body and relative to the main body to expose the formed object and the non-bonded powder to the chamber;
a powder removing processing mechanism configured to remove the non-bonded powder existing around the formed object by moving the stage relative to the box opening while applying a gas to the formed object and the non-bonded powder, the powder removing processing mechanism including an exhaust fan system to remove powder entrained in the gas and holes in the floor via which the non-bonded powder can fall through;
a container positioned to catch the non-bonded powder falling through the holes in the floor; and
a nozzle driving mechanism configured to control ejection of the gas onto the formed object according to a weight of the non-bonded powder collected into the container, wherein the exhaust fan system is structured to direct exhaust gas to the container.

2. The apparatus according to claim 1, wherein
the box is capable of vertically accommodating a plurality of formed objects on a plurality of shelves, and
the apparatus further comprises a controlling part configured to (a) operate the stage moving mechanism such that corresponding one of the plurality of formed objects accommodated on the plurality of shelves is extruded from the main body for each of the plurality of shelves, and (b) operate the powder removing processing mechanism for each of the plurality of shelves.

3. The apparatus according to claim 1, further comprising:
an acquiring part configured to acquire related information related to the formed object inside the main body of the box; and
a controlling part configured to operate the powder removing processing mechanism based on the acquired related information.

4. The apparatus according to claim 3, wherein the acquiring part is configured to acquire at least three-dimensional data related to the formed object.

5. The apparatus according to claim 4, wherein the powder removing processing mechanism includes:
an articulating nozzle configured to eject the gas onto the formed object, and
the nozzle driving mechanism configured to variably drive at least one of a position and a posture of the nozzle according to control of the controlling part based on the three-dimensional data.

6. The apparatus according to claim 1,
wherein the powder removing processing mechanism includes, a nozzle configured to eject the gas onto the formed object.

7. The apparatus according to claim 1, further comprising:
a determining part configured to determine progress of powder removing processing of the powder removing processing mechanism.

8. The apparatus according to claim 7,
wherein the determining part includes a sensor configured to detect an amount of the non-bonded powder collected from the powder removing processing mechanism.

9. The apparatus according to claim 7, wherein the determining part includes a sensor configured to detect a degree of clearness of atmosphere inside the chamber.

10. The apparatus according to claim 1, further comprising: a sieving mechanism configured to remove a foreign substance from the non-bonded powder entering the container.

11. The apparatus according to claim 1, wherein the box holding mechanism is configured to move the box vertically relative to the opening in the floor of the chamber.

12. A molding system, comprising:
a molding apparatus configured to form a formed object using powder according to a rapid prototyping technique; and
an apparatus comprising:
a chamber with a floor, the floor having an opening;
a box having a main body with an opening and a stage movable within the main body, the box being capable of accommodating therein a formed object and non-bonded powder on the stage within the box;
a box holding mechanism to hold the box in registration with the opening in the floor of the chamber;
a stage moving mechanism capable of controllably moving the stage vertically inside the main body and relative to the main body and to expose the formed object and the non-bonded powder to the chamber;
a powder removing processing mechanism configured to remove the non-bonded powder existing around the formed object by moving the stage relative to the box opening while applying a gas to the formed object and the non-bonded powder, the powder removing processing mechanism including an exhaust fan system to remove powder entrained in the gas and holes in the floor via which the non-bonded powder can fall through;
a container positioned to catch the non-bonded powder falling through the holes in the floor; and
a nozzle driving mechanism configured to control ejection of the gas onto the formed object according to a weight of the non-bonded powder collected into the container,
wherein the exhaust fan system is structured to direct exhaust gas to the container.

* * * * *